(12) United States Patent
Yoshida et al.

(10) Patent No.: US 6,991,062 B2
(45) Date of Patent: Jan. 31, 2006

(54) BALL SCREW AND WHEEL STEERING DEVICE HAVING THE SAME

(75) Inventors: Isamu Yoshida, Iwata (JP); Keisuke Kazuno, Iwata (JP); Morihisa Yoshioka, Iwata (JP)

(73) Assignee: NTN Corporation, Osaka-fu (JP)

( * ) Notice: Subject to any disclaimer, the term of this patent is extended or adjusted under 35 U.S.C. 154(b) by 21 days.

(21) Appl. No.: 10/065,076

(22) Filed: Sep. 13, 2002

(65) Prior Publication Data

US 2004/0050614 A1 Mar. 18, 2004

(30) Foreign Application Priority Data

Sep. 13, 2002 (JP) .......................... 2001-295640

(51) Int. Cl.
*B62D 5/04* (2006.01)

(52) U.S. Cl. .......................... 180/444; 74/499
(58) Field of Classification Search ................. 180/444; 74/499, 459, 388 PS, 424.71, 89.23, 89.25, 74/89.32, 89.33, 89.37, 89.45, 216.3, 89.36
See application file for complete search history.

(56) References Cited

U.S. PATENT DOCUMENTS

| | | | | |
|---|---|---|---|---|
| 5,590,732 A | * | 1/1997 | Sugino et al. .............. | 180/444 |
| 5,738,181 A | * | 4/1998 | Kato ........................... | 180/400 |
| 6,112,610 A | * | 9/2000 | Welling ........................ | 74/459 |
| 6,186,268 B1 | * | 2/2001 | Onodera et al. ............ | 180/444 |
| 6,378,646 B1 | * | 4/2002 | Bugosh ....................... | 180/444 |
| 6,464,034 B1 | * | 10/2002 | Toda et al. .................. | 180/444 |

FOREIGN PATENT DOCUMENTS

| | | |
|---|---|---|
| JP | 08-133098 | 5/1996 |
| JP | 11-082666 | 3/1999 |
| JP | 2000-296780 | * 10/2000 |
| JP | 2000-326857 | 11/2000 |

* cited by examiner

*Primary Examiner*—Anne Marie Boehler
(74) *Attorney, Agent, or Firm*—J. C. Patents

(57) ABSTRACT

A ball screw mechanism comprises a screw shaft, a nut and balls. The nut has a cylindrical portion in the axial middle on the outer peripheral surface thereof that becomes a fitting surface for fitting in a sleeve, and small diameter step portions in the opposite axial sides on the outer peripheral surface thereof that become non-fitting surfaces not fitting in the sleeve. A portion of a wheel steering shaft is provided with the screw shaft, and a plurality of balls are disposed in a rolling way defined between a thread groove formed in the outer periphery of the screw shaft and a thread groove formed in the inner periphery of the nut.

9 Claims, 4 Drawing Sheets

BALL SCREW AND WHEEL STEERING DEVICE HAVING THE SAME

CROSS REFERENCE TO RELATED APPLICATIONS

This application claims the priority benefit of Japanese application serial no. 2001-295640, filed on Sep. 27, 2001.

BACKGROUND OF INVENTION

1. Field of Invention

The present invention relates to a ball screw used, for example, in an automobile wheel steering device, and also relates to a wheel steering device having the same.

2. Prior Art

Devices that use ball screws for the steering of wheels of an automobile are known. One such device is an electrically operated power steering device that supplements the steering force on the steering wheel of an automobile by an electric motor.

Described in Japanese Patent Application Laid-Open under No. H09-142315 is an electrically operated power steering device using a ball screw. This electrically operated power steering device is so designed that the thread groove diameter of the nut constituting the ball screw is gradually increased as the nut extends axially outward. Therefore, when the axis of the screw shaft deviates or bends with respect to the nut, distortion of the screw shaft and the nut is prevented, ensuring smooth operation of the ball screw.

Further, described in Japanese Patent Application Laid-Open under No. H11-268658 is an electrically operated power steering device using another ball screw. This electrically operated power steering device is concerned with balls constituting a ball screw, and is designed so that the balls disposed in the axial middle region are lager in diameter than those disposed in the opposite axial ends. Therefore, when a deflection or axis deviation occurs in the screw shaft, the distortion of the screw shaft and the nut is prevented, ensuring smooth operation of the ball screw.

With the arrangements of the prior art described above, the following problems are left. In the construction described in Japanese Patent Application Laid-Open under No. H09-142315, the thread groove of the nut must be machined so that the groove diameter gradually increases as the nut extends axially outward, requiring much time for machining, management of the thread groove diameter after machining not being easy, a fact which forms a cause of interference with an effort toward cost reduction.

On the other hand, in the construction described in Japanese Patent Application Laid-Open under No. H11-268658, two kinds of balls must be installed in the middle and on the opposite sides, so that much time is required in assembly operation and the two kinds of balls must be managed, a fact which forms a cause of interference with an effort toward cost reduction. Further, if a mistake is made in incorporating the two kinds of balls, the prevention of distortion, which is the intended object, cannot be attained, possibly incurring the shortening of life of the ball screw.

SUMMARY OF INVENTION

With such situation in mind, the invention provides a ball screw that is capable of preventing the distortion of a screw shaft and nut in the prior art, which is the intended object, shortening the time taken for machining and assembling, and reducing costs; and it also provide a wheel steering device having the same.

In order to achieve such object, a ball screw according to an embodiment of the present invention employs an arrangement comprising a screw shaft having a thread groove in the outer periphery thereof, a nut having a thread groove in the inner periphery thereof opposed to the screw shaft, and a plurality of balls disposed in a rolling way defined between the thread groove in the screw shaft and the thread groove in the nut, wherein a fitting surface engaging a support member supporting the nut fitted therein is formed on the outer peripheral surface of the nut in the axial middle region of the rolling way and non-fitting surfaces that do not contact the support member are formed on the outer peripheral surface of the nut on the opposite axial sides of the rolling way.

In this case, the axial middle region of the rolling way refers to, of the entire axial length of the rolling way defined between the screw shaft and the nut and in which balls are disposed, the region located in the axial middle, and the opposite axial sides of the rolling way refer to, of the entire axial length of the rolling way, the regions located in the opposite axial sides.

Thus, if an arrangement is employed in which a fitting surface engaging a support member supporting the nut fitted therein is formed on the outer peripheral surface of the nut in the axial middle region of the rolling way and non-fitting surfaces that do not contact the support member are formed on the outer peripheral surface of the nut on the opposite axial sides of the rolling way, then the outer peripheral surface of the nut in the axial middle region fits in the support member, thereby suppressing a play between balls, the screw shaft and the nut in the axial middle, suppressing the backlash of the ball screw, so as to realize a smooth operation, and on the other hand, since, in the opposite axial sides, the outer peripheral surface of the nut does not engage the support member, the nut is allowed to elastically deform in the loading direction when the deviation or bending of the axis of the screw shaft occurs; thus the occurrence of distortion can be prevented. That is, with a ball screw comprising a screw shaft having a constant thread groove diameter, a nut and balls having a single ball diameter, it is possible to prevent the occurrence of distortion, resulting in the time, and accordingly the cost, required for machining the ball screw and assembly operation being reduced.

The nut may have a substantially cylindrical shape, and the nut may be smaller in outer diameter at the opposite axial sides formed with the non-fitting surfaces than at the axial middle thereof provided with the fitting surface, to thereby make the nut simple in shape, and further reduce costs.

The outer peripheral surface of the nut in the opposite axial sides may be gradually reduced toward the axial ends of the nut, to thereby facilitate incorporation of the nut into the support member adapted to have the nut fitted therein.

The non-fitting surfaces may extend over a distance of at least one lead axially inward from the opposite axial ends of the rolling way, to thereby effectively prevent the occurrence of distortion in the ranges at the opposite ends over one lead that are the regions where distortion is most likely to occur.

According to another embodiment of the invention, a wheel steering device includes a ball screw comprising a screw shaft portion formed as a portion of a steering shaft for steering a wheel and having a thread groove formed therein, a nut having a thread groove in the inner periphery thereof opposed to the screw shaft portion and rotated by a motor, and a plurality of balls disposed in a rolling way defined between the screw shaft portion and the nut, wherein a fitting surface engaging a support member supporting the nut fitted therein is formed on the outer peripheral surface of the nut in the axial middle region of the rolling way and non-fitting surfaces that do not contact the support member are formed on the outer peripheral surface of the nut on the opposite axial sides of the rolling way. Thus, it is possible to prevent the ball screw from being distorted when subjected to an excessive load, to provide an improved steering feeling, and to reduce costs.

Again, the nut may have a substantially cylindrical shape, and the nut may be smaller in outer diameter at the opposite axial sides formed with the non-fitting surfaces than at the axial middle thereof. The outer peripheral surface of the nut in the opposite axial sides may be gradually reduced toward the axial ends of the nut. The non-fitting surfaces may extend over a distance of at least one lead axially inward from the opposite axial ends of the rolling way.

The nut may be fitted, with a tight fit, in a rotating member that rotates the nut by the motor, so that the fixing of the nut is further simplified and that the play between the balls, the screw shaft and the nut that occurs in the axial middle region of the rolling way can be adjusted by increasing or decreasing the interference.

DETAILED DESCRIPTION

Figure 1:
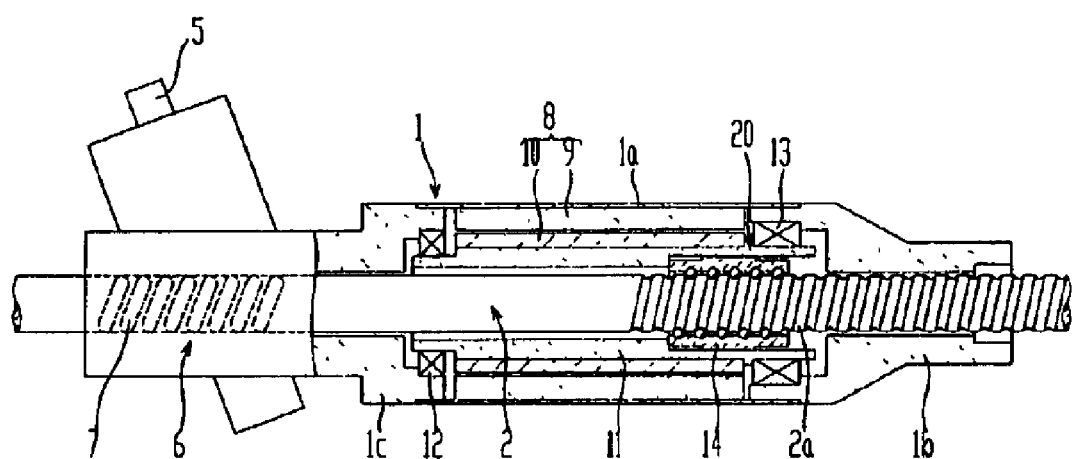
FIG. 1 is a cutaway front view of an electrically operated power steering device according to a first embodiment of the invention.
Figure 2:
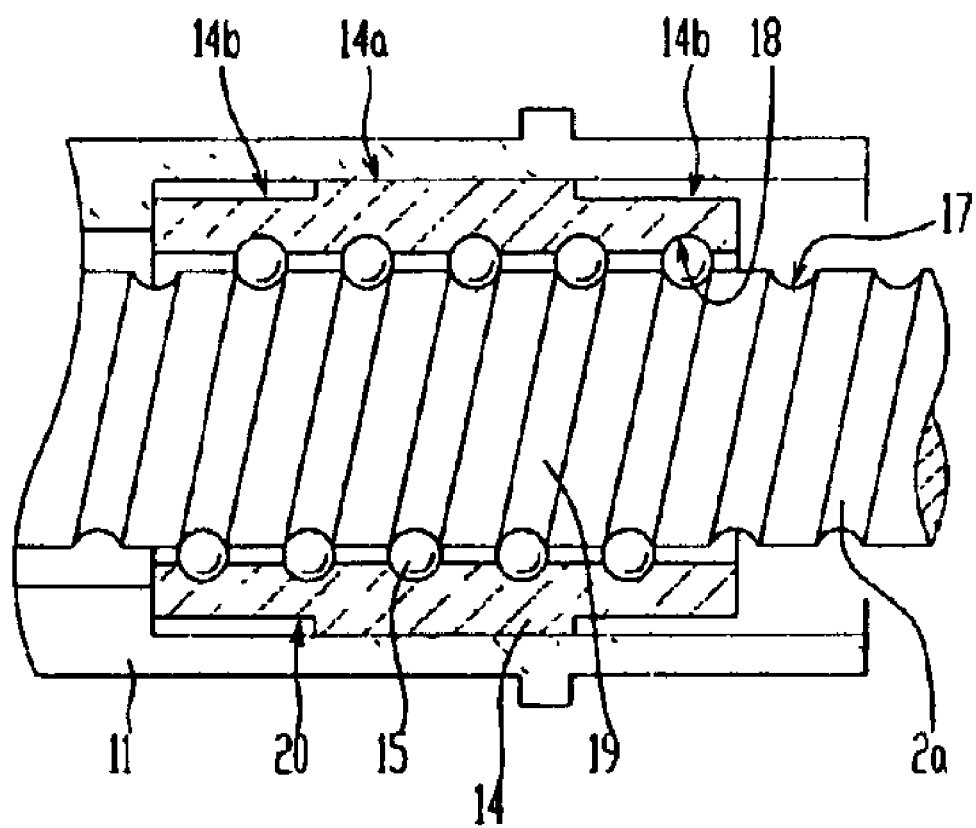
FIG. 2 is a partial enlarged sectional view of FIG. 1.

A first embodiment of the invention will now be described with reference to FIGS. 1 and 2. FIG. 1 is a cutaway front view of an electrically operated power steering device that is an example of a wheel steering device having the ball screw of the invention. FIG. 2 is an enlarged view of a ball screw mechanism for this electrically operated power steering device. In FIG. 1, a housing 1 has a bracket (not shown) and is fixed to a car body. A steering shaft 2 extends through the housing 1 and is connected at its opposite sides to a wheel steering mechanism (not shown). A steering wheel shaft 5 is installed to extend obliquely upward from one end of the housing 1, and has a steering wheel connected to the upper end thereof. The steering wheel shaft 5 is rotatably supported and its rotation is transmitted as an axial advancing/retracting force to the steering shaft 2 through a conversion mechanism 6 at the lower end thereof. The conversion mechanism 6 comprises a rack 7 formed in a longitudinal portion of the steering shaft 2, and a pinion (not shown) installed on the lower end of the steering wheel shaft 5, the pinion meshing with the rack 7 within the housing 1. A steering toque detector (not shown) is installed for the steering wheel shaft 5 so as to detect the steering toque produced therein.

The housing 1, which is cylindrically formed, is constructed by joining end members 1b and 1c to the opposite ends of a middle cylindrical body 1a. Installed in the axial middle of the housing 1 is the stator 9 of an electric motor 8. The stator 9 is composed of a core and a stator coil. The rotor 10 of the electric motor 8 is installed around the inner periphery of the stator 9 with a gap defined therebetween. The rotor 10 is cylindrically formed of magnetic material, and is attached to the outer periphery of a sleeve 11 so that it rotates as a unit with the sleeve 11. The steering shaft 2 is inserted through the sleeve 11 for axial advance and retraction. The electric motor 8 is controlled by a motor control circuit (not shown) according to the detected value given by the steering torque detector.

The sleeve 11 is rotatably supported in the housing 1 through bearings 12 and 13. The sleeve 11 has the nut 14 fitted therein and rotates as a unit with the nut 14. The steering shaft 2 extends through the nut 14.

As shown enlarged in FIG. 2, the nut 14 is substantially cylindrical, and has a cylindrical portion 14a serving as a fitting surface for fitting in the sleeve 11, on the outer peripheral surface of the nut in the axial middle, and small-diameter step portions 14b serving as non-fitting surfaces that do not fit in the sleeve 11, on the outer peripheral surface of the nut in the axial opposite sides. The nut 14 is fixed so that its cylindrical portion 14a closely adheres to the inner periphery of the sleeve 11.

A portion of the steering shaft 2 is provided with a screw shaft portion 2a, and a plurality of balls 15 are disposed in a rolling way 19 defined between a thread groove 17 formed in the outer periphery of the screw shaft portion 2a and a thread groove 18 formed in the inner periphery of the nut 14. The screw shaft portion 2a, nut 14 and balls 15 constitute a ball screw mechanism 20.

The operation and function of this electrically operated power steering device will now be described. When the vehicle is linearly moving with the turning of the steering wheel stopped, no torque signal is delivered from the steering torque detector (not shown) of the steering wheel shaft 5, and the electric motor 8 is placed in its rotation stop state by a motor control means (not shown). Therefore, this electrically operated power steering device is in a state not delivering an auxiliary steering force. When the steering wheel is rotated, a toque signal is delivered from the steering torque detector of the steering wheel shaft 5, and the electric motor 8 rotates the rotor 10 under the control of the motor control circuit. When the rotor 10 rotates, the nut 14 of the ball screw mechanism 20 rotates together with the rotor 10, and the steering shaft 2 constituting a portion of the screw shaft portion 2a axially advances and retracts, thereby generating an auxiliary steering force. At this time, the balls 15 of the ball screw mechanism 20 roll in the rolling way 19 defined between the thread grooves 17 and 18 as the nut 14 is rotated. Thus, the steering force is supplemented by the electric motor 8.

In this embodiment, the nut 14 fits in the sleeve 11 at the cylindrical portion 14a in the axial middle and does not fit in the sleeve 11 at the small diameter step portions 14b in the axial opposite sides. Such arrangement allows the cylindrical portion 14a to be firmly supported in the sleeve 11, thus suppressing the play between the balls, the screw shaft and the nut in the axial middle, suppressing the backlash of the ball screw, so as to realize a smooth operation. Further, since the small diameter step portions 14b do not engage the sleeve 11, when the deviation or bending of the axis of the screw shaft occurs, the small diameter step portions 14b are allowed to elastically deform in the loading direction, preventing the occurrence of distortion of the screw shaft and the nut; therefore, a good steering feeling is obtained. In this case, the small diameter step portions 14b, which become the non-fitting surfaces, are formed over a width of 1.5 lead axially inward from the opposite axial ends of the rolling way 19. Thus, the provision of the small diameter step portions 14b having a width of 1.5 lead prevents the occurrence of distortion at the axial opposite ends of the rolling way 19 where such distortion is most likely to occur. The provision of the small diameter step portions 14b, which become the non-fitting surfaces, over a width of at least one lead axially inwardly of the nut 14 from the axial opposite ends of the rolling way 19 makes it possible to effectively prevent distortion at the axial opposite ends.

Figure 3:
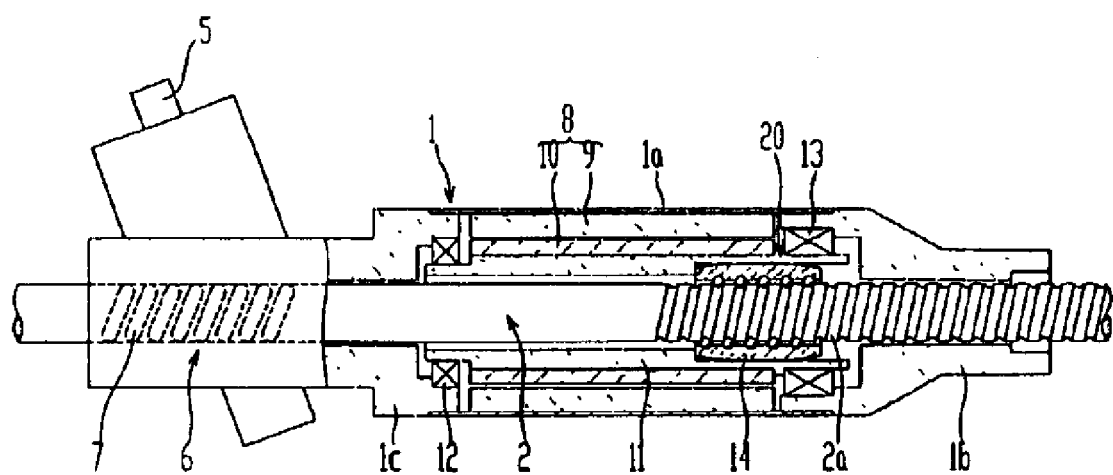
FIG. 3 is a cutaway front view of an electrically operated power steering device according to a second embodiment of the invention.
Figure 4:
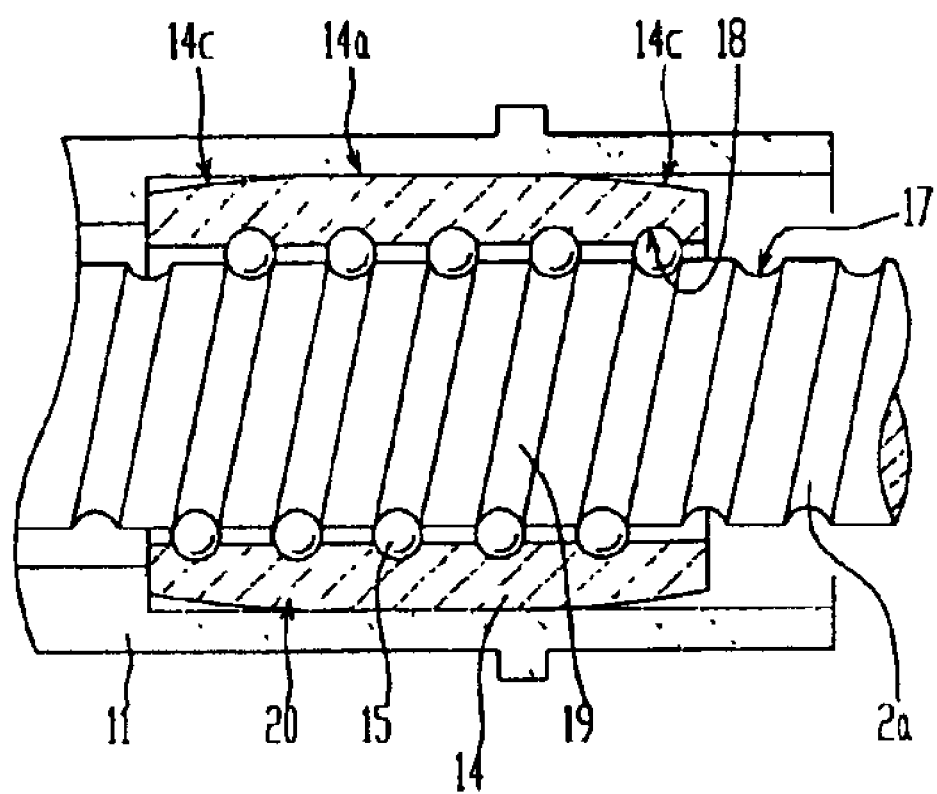
FIG. 4 is a partial enlarged sectional view of FIG. 2.

A second embodiment of the invention will now be described with reference to FIGS. 3 and 4. FIG. 3 is a cutaway front view of an electrically operated power steering device that is an example of a wheel steering device using a ball screw according to the invention. FIG. 4 is an enlarged view of the ball screw mechanism of the electrically operated power steering device. What differs from the first embodiment shown in FIGS. 1 and 2 is only the shape of the axial opposite sides of the nut 14 and the method of fixing the nut, like parts of the rest being denoted by like reference characters to omit a detailed description thereof.

As shown enlarged in FIG. 4, the nut 14 is substantially cylindrical and has a fitting surface 14a in its axial middle for fitting in the sleeve 11 and taper portions 14c in its axial opposite sides that become non-fitting surfaces not fitting in the sleeve 11. The taper portions 14c gradually decrease in diameter toward the axial opposite ends of the nut. Therefore, incorporation of the nut 14 into the sleeve 11 is facilitated. In addition, in this embodiment, the non-fitting surface is in the form of a taper surface; however, the non-fitting surface may be in the form of a crowing-shaped surface gradually decreasing in diameter toward the axial ends of the nut.

The nut 14 is press-fitted at its cylindrical portion 14a in the inner periphery of the sleeve 11 to be fixed therein with a tight fit. If the amount of interference this time is set at some $\mu$m to some 10 $\mu$m or so, then the axial middle of the nut is reduced in diameter by press-fitting, so that the thread groove diameter in the axial middle becomes smaller than the thread groove diameter in the axial opposite ends. For this reason, the play between the balls, the screw shaft and the nut is suppressed and so is the backlash of the ball screw, thus realizing a smooth operation, imparting a suitable amount of play between the balls, the screw shaft and the nut in the axial opposite sides, preventing the occurrence of distortion; thus, a good steering feeling is obtained.

Embodiments of the invention have so far been described using electrically operated power steering devices. However, the ball screw of the invention is also applicable to other uses than electrically operated power steering devices. For example, it is suitable for uses where a large moment acts on the screw shaft. Further, the wheel steering device of the invention is also applicable, besides electrically operated power steering devices, to a wheel steering device for rear wheels used in a system (called ARS system (active rear steer)) for electronically controlling the steering for the rear wheel angle, in an automobile in which the front wheels are steered by a steering wheel, to monitor the wheel speed of the front wheels to ensure that the car body has always a target car body slip angle.

What is claimed is:

1. A ball screw comprising a screw shaft having a thread groove in the outer periphery thereof, a nut having a thread groove in the inner periphery thereof opposed to said screw shaft, and a plurality of balls disposed in a rolling way defined between said thread groove in said screw shaft and said thread groove in said nut, wherein a fitting surface engaging a support member with a direct contact for supporting said nut fitted therein is formed on the outer peripheral surface of the nut in the axial middle region of said rolling way and non-fitting surfaces that do not contact said support member are formed on the outer peripheral surface of the nut on the opposite axial sides of said rolling way, wherein the axial middle region includes a center point of the nut, wherein the fitting surface and the non-fitting surfaces of the nut are smoothly joined as a smooth convex surface, wherein said non-fitting surfaces extend over a distance of at least one lead axially inward from the two opposite axial ends of said rolling way.

2. A ball screw as set forth in claim 1, wherein said nut has a substantially cylindrical shape, and the nut is smaller in outer diameter at the opposite axial sides formed with said non-fitting surfaces than at the axial middle thereof.

3. A ball screw as set forth in claim 1, wherein the outer peripheral surface of the nut in the opposite axial sides is gradually reduced toward the axial ends of the nut.

4. A ball screw as set forth in claim 1, wherein the fitting surface is tightly-fitting the support member supporting said nut fitted therein.

5. A wheel steering device having a ball screw comprising a screw shaft portion formed as a portion of a steering shaft for steering a wheel and having a thread groove formed therein, a nut having a thread groove in the inner periphery thereof opposed to the screw shaft portion and rotated by a motor, and a plurality of balls disposed in a rolling way defined between said screw shaft portion and said nut, wherein a fitting surface engaging a support member with a direct contact for supporting said nut fitted therein is formed on the outer peripheral surface of the nut in the axial middle region of said rolling way and non-fitting surfaces that do not contact said support member are formed on the outer peripheral surface of the nut on the opposite axial sides of said rolling way, wherein the axial middle region includes a center point of the nut, wherein the fitting surface and the non-fitting surfaces of the nut are smoothly joined as a smooth convex surface, wherein said non-fitting surfaces extend over a distance of at least one lead axially inward from the two opposite axial ends of said rolling way.

6. A wheel steering device as set forth in claim 5, wherein said nut has a substantially cylindrical shape, and the nut is smaller in outer diameter at the opposite axial sides formed with said non-fitting surfaces than at the axial middle thereof.

7. A wheel steering device as set forth in claim 5, wherein the outer peripheral surface of the nut in the opposite axial sides is gradually reduced toward the axial ends of the nut.

8. A wheel steering device as set for the in claim 5, wherein said nut is fitted, with a tight fit, in a rotating member that rotates said nut by the motor.

9. A wheel steering device as set forth in claim 5, wherein the fitting surface is tightly-fitting the support member supporting said nut fitted therein.

* * * * *